Feb. 12, 1952     H. F. MARTIN     2,585,025
DRILLING MACHINE
Filed Aug. 2, 1948     2 SHEETS—SHEET 1
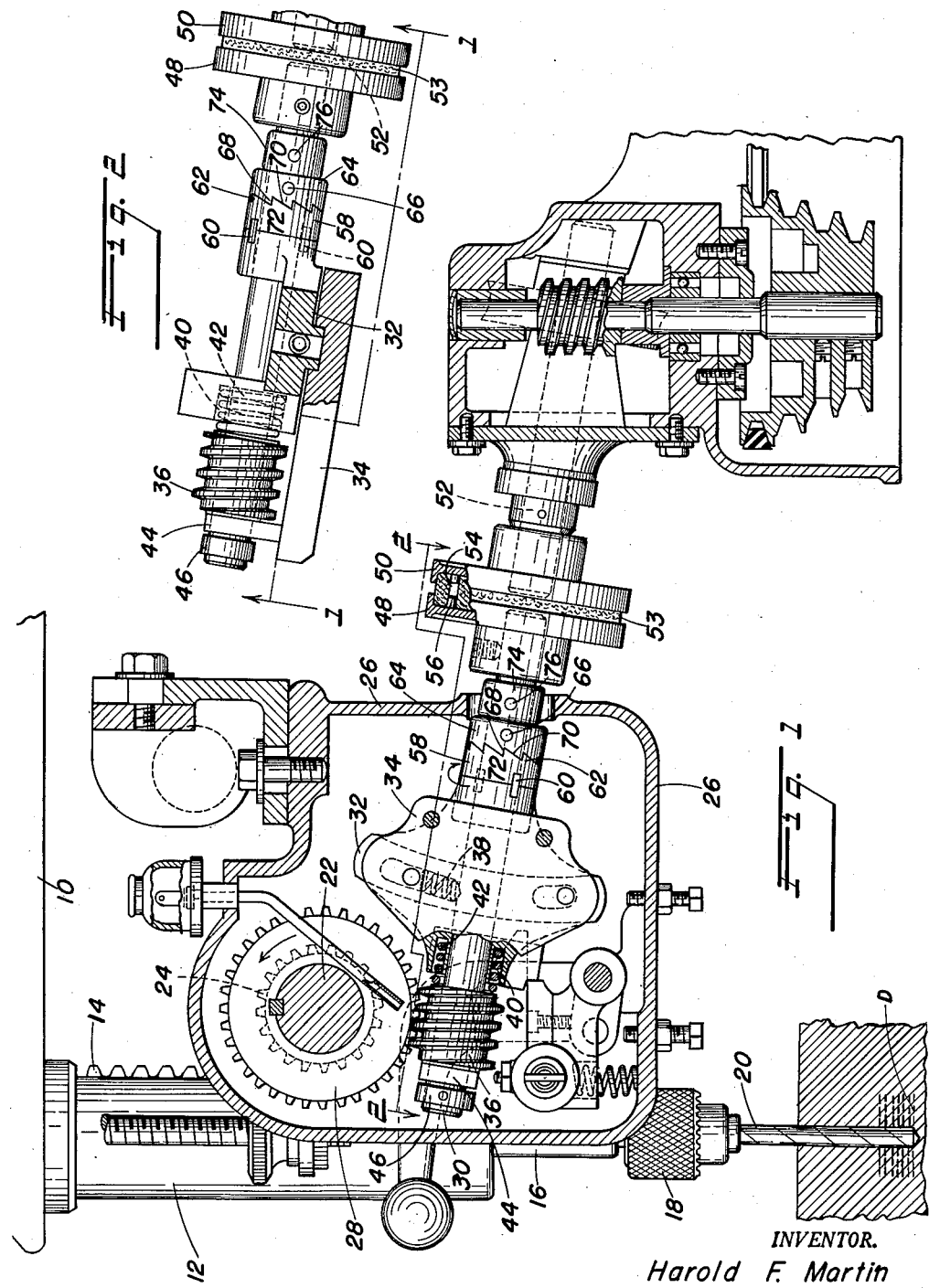
INVENTOR.
Harold F. Martin
BY Strauch & Hoffman
attorneys Feb. 12, 1952 — H. F. MARTIN — 2,585,025
DRILLING MACHINE
Filed Aug. 2, 1948 — 2 SHEETS—SHEET 2
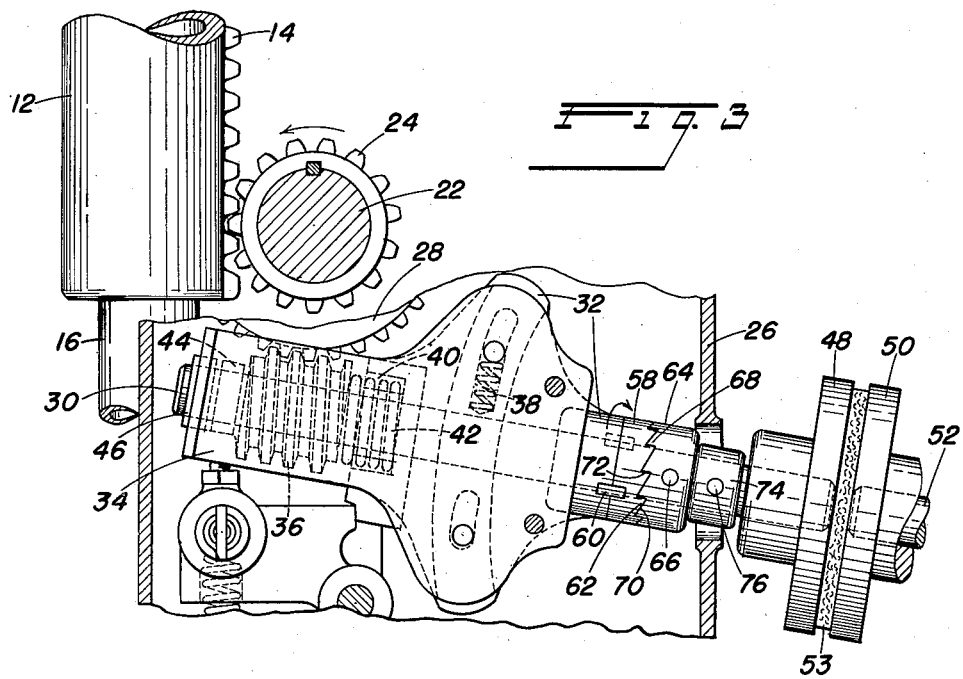
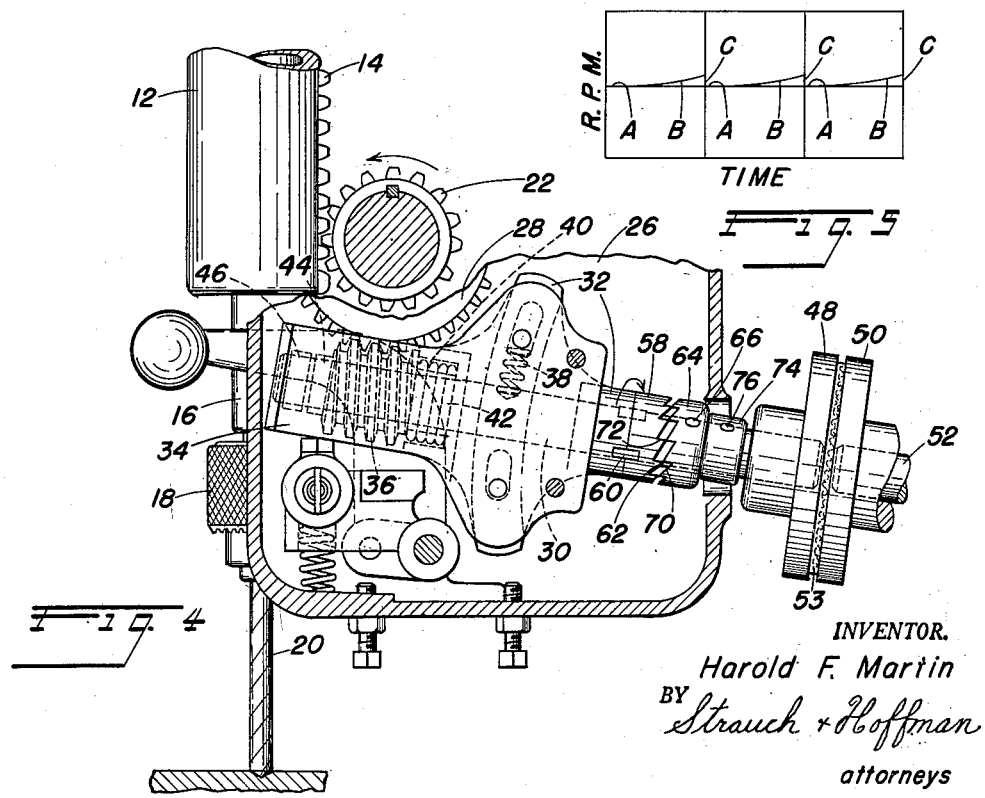
INVENTOR.
Harold F. Martin
BY Strauch + Hoffman
attorneys Patented Feb. 12, 1952

2,585,025

UNITED STATES PATENT OFFICE 2,585,025

DRILLING MACHINE

Harold F. Martin, Milwaukee, Wis., assignor to The Rockwell Manufacturing Company, Pittsburgh, Pa., a corporation of Pennsylvania Application August 2, 1948, Serial No. 42,050

3 Claims. (Cl. 77—32.3)

This invention relates to machine tools and more particularly to a cutting or drilling machine of the type disclosed in the patent of Christy A. Wiken and Hugo V. Boehnke, No. 2,396,733, issued March 19, 1946.

It is the general object and purpose of the present invention to provide certain improvements in the power feed mechanism for the drill or other cutting tool and to so control the operation of said tool that the hole or bore will be more accurately and rapidly drilled in the work piece, with the use of feed gearing of conventional form.

It is a more particular object of the invention to provide means for automatically controlling the operation of power operated drill spindle feed gearing of conventional form, whereby short feeding movements are transmitted to the drill in rapid succession so that in each interruption of the drilling or cutting action the rotating drill will effectively break up the chips and thereby minimize frictionally generated heat and the possibility of jamming the drill inherent in production of long chips.

A further object of the invention resides in the provision of means for controlling the intermittent effective operation of drill spindles or the like embodying driving and driven elements having peripheral coacting power transmission means, together with means for relatively shifting said members at spaced time intervals, without interruption of driving power to said driving member and while maintaining a constant angular axial relationship between said members, to momentarily render the peripheral power transmission means of said members ineffective to transmit power to said driven member.

A more specific object, in one practical embodiment of the invention, is to provide a power driven worm mounted for axial movement with spring means yieldingly urging said worm in one direction to normal driving position relative to the worm gear, and cam means repeatedly operable in each rotation of the worm to move the same axially in the opposite direction and intermittently accelerate rotation of the worm gear.

Still another object is to provide a rockable bearing for the axially movable worm shaft for moving the worm in an arcuate path into and out of cooperative relation with the worm gear, together with mating cam members, one of which is fixed to said bearing and the other keyed to the worm shaft.

It is also the aim and purpose of the present invention to provide feed control means for drills or other cutting tools, as above characterized, which involves the addition of a minimum number of structurally simple elements to the machine of the above mentioned patent, and which is especially advantageous in the drilling of deep holes or bores in tough metal where great heat is generated and serious jamming of the drill is likely to occur as a result of the formation of long chips.

With the above and other subordinate objects in view, the invention comprises the novel mechanism for controlling the operation of machine tools or the like, and the construction and relative arrangement of its several parts, as will hereinafter be more fully described, illustrated in the accompanying drawings, and subsequently incorporated in the subjoined claims.

In the drawings, wherein I have disclosed one simple and practical embodiment of the invention, and in which similar reference characters designate corresponding parts throughout the several views:

Figure 1 is a sectional view, illustrating one practical form of the present invention as embodied in a power feed mechanism for a drill press, said section being taken in a vertical plane at one side of the flexibly coupled drive shaft sections;

Figure 2 is a horizontal section taken substantially on the line 2—2 of Figure 1;

Figure 3 is a view similar to Figure 1, part of the drive means being omitted and showing the driving worm in its normal position at the start of a feeding movement of the drill spindle;

Figure 4 is a view similar to Figure 3, showing the relative positions of the coacting cam members just prior to the termination of one of the advancing step movements of the spindle feeding quill; and Figure 5 is a feed curve diagram of the intermittent feeding movements of the drill.

In the accompanying drawings, I have illustrated only those parts of the drill press shown in Patent No. 2,396,733, as will enable the present improvements to be clearly understood, and it will become apparent, as this description proceeds, that the novel features of the present invention are applicable as well for controlling the intermittent operation of cutting or work fashioning tools of various types.

Having the above considerations in mind, in Figure 1 of the drawings a machine head is partially shown at 10, in which a spindle feeding quill 12 is mounted for vertical reciprocating movement in the customary manner, said quill being provided with a longitudinally extending series of rack teeth 14. The drill spindle 16 is suitably journalled in the quill 12 for unitary vertical movement therewith, and is adapted to be driven at high speed through suitable driving elements connected between the upper end of the spindle and a motor or other convenient source of power. The lower end of the spindle 16 carries the usual chuck 18 for the drill or other cutting tool 20.

A transversely positioned shaft 22 is journalled in suitable bearings on the machine head and has a pinion 24 integrally formed with or secured thereto, and in constant mesh with the rack teeth 14 of the quill 12. One end of the shaft 22 extends through a housing 26 suitably mounted upon a part of the machine frame and within said housing, a relatively large diameter worm gear 28 is keyed or otherwise suitably fixed to said shaft.

Within the housing 26, an inclined shaft 30 is journalled upon a bearing member 32 mounted for vertical movement in an arcuate path upon a support 34, fixed to one side wall of the housing 26. To the forward end of the shaft 30, a worm 36 is secured for cooperative engagement with the teeth of the worm gear 28 and means is provided for releasably holding the bearing member 32 against movement in one direction under the action of spring means indicated at 38 to retain the thread of the worm 36 in operative engagement with the teeth of worm gear 28. Since the means for mounting the shaft 30 with worm 36 for rocking movement into and out of its operative driving position and for releasably locking the same in driving position, is fully described in the above mentioned issued patent, it will not herein be further described in detail. It will suffice to state that the forward shaft bearing of member 32 is provided with a cylindrical recess 40 which receives one end of a spring 42, the other end of which bears against the rear side face of the worm 36, said spring acting to yieldingly urge the worm 36 and shaft 30 forwardly to a normal position relative to the bearing member 32. Preferably, at the front side of worm 36, a bearing block 44 is loosely retained on the end of shaft 30 by the collar 46 pinned or keyed to said shaft. This block has sliding contact upon the face of the support 34 and serves to stabilize the shaft 30 and bearing member 32 in the rocking movement thereof, and insure a correct cooperative relationship between the worm thread and the teeth on gear 28 in the engaged position of said worm.

The other end of worm shaft 30 extends externally of the housing 26 through an opening in the rear wall thereof and to the same one flanged member 48 of a flexible coupling unit is rigidly fixed. The companion flanged member 50 of this coupling unit is similarly fixed to the forward end of the output shaft 52 of a speed reduction unit mounted on the frame. This primary speed reduction unit or drive element is fully described in the above mentioned issued patent and operatively connected with the spindle driving motor. Between the members 48 and 50, a coupling disc 53 of suitable flexible material is interposed and is provided with a plurality of spaced openings 54 in which studs 56 on coupling member 48 are freely movable in the axial movements of the worm drive shaft 30.

Within the housing 26 and surrounding worm shaft 30, a cam member 58 is pinned or otherwise rigidly fixed as shown at 60 to the rear shaft bearing of member 32. The rear face of the member 58 is formed with a plurality of cam teeth or lugs 62 equidistantly spaced about the shaft 30. A mating cam member 64 is pinned or keyed to the shaft 30 as at 66 and is likewise provided with cam teeth or lugs 68 equidistantly spaced about the shaft 30, and confronting the cam lugs or teeth 62 of the member 58. The teeth 62 and 68 on the respective cam members have coacting inclined cam faces 70 terminating in the shoulders 72, parallel to the axis of shaft 30. A spacing collar 74 interposed between coupling member 48 and cam member 64 is fixed to shaft 30 by the pin 76.

From the above description, it will be readily understood that with the worm 36 in engaged position relative to worm gear 28, as shown in Figures 1 and 3, power is transmitted from the drill operating motor through the primary reduction gearing and flexible coupling to the shaft 30, cam member 64, and worm 36 which together constitute a driving member, in the direction indicated by the arrow in Figure 3. The power transmitting means, consisting of the worm gear 28, shaft 22 and pinion 24 will thus be driven by worm 36 in a counterclockwise direction. Simultaneously with the driving effort on gear 28 due to the rotation of worm 36, cam member 64 rotates with shaft 30 relative to the fixed cam member 58, and in the sliding coaction of the ratcheting cam faces 70 of said members, shaft 30 and worm 36 are moved axially backward in the direction of lead of the worm thread against the resistance of spring 42, and said spring is placed under compression. Thus a cumulative or additive rotative impulse is transmitted to worm gear 28 by the pressure of the worm thread against the gear teeth in such axial movement of the worm. This axial movement is substantially equal to the depth of the cam shoulders 72. In this manner, the rotation of worm gear 28 and shaft 22 is accelerated to provide a normal advancing feed movement of the quill until the cam teeth on member 64 move beyond the end shoulders 72 of the cam teeth on member 58. A sudden reaction then occurs by reason of the energy stored in the resilient means 42, and shaft 30 and worm 36 are axially moved forwardly. While this may cause a slight retrograde or reverse rotation of gear 28 and pinion 24, it is comparatively slight due to play in the rack and pinion teeth and the worm gearing.

In each revolution of the shaft 30 and worm 36, gear 28 and shaft 22 will be intermittently rotated, the number of such rotations corresponding to the number of cam teeth 62 and 68, and the degree or duration of each rotative feeding movement transmitted to shaft 22 and pinion 24 being predetermined by the helix angle of the worm thread plus the length of axial movement of the worm 36, which in turn is determined by the form of the cam lugs 62 and 68 and the length of cam faces 70.

In each intermittent rotation of pinion 24, a downward axial movement is transmitted to the quill 12 and rotating spindle 16, thus advancing the drill 20 into the work in a rapid succession of step movements, with each of said movements of the drill having a penetration depth substantially as indicated at D in Figure 1 of the drawings. The cumulative effect of axial movement of the rotating worm which results in accelerated intermittent rotary movements of the quill actuating pinion 24 and increments of axial feeding movement of the drill at comparatively high speed and increased length, is graphically illustrated by the curve in Figure 5 of the drawings. Thus the part A of the curve represents revolutions per minute of the pinion 24 caused by the helix angle of worm 36, which gradually increases to a predetermined maximum as concurrent axial movement is imparted to the worm, by the rotation of cam member 64 relative to fixed cam member 58, as represented by the part B of the feed curve. When lugs 68 of cam member 64 ride off of the lugs 62 of cam member 58, and the axial movement of worm 36 is reversed, the accelerated rotating speed of pinion 24 abruptly ceases and is immediately followed by a resumption of rotation of said drill pinion at the lower speed, as represented at C in Figure 5. When this occurs, there is a hesitation in the feeding movement of the drill spindle and downward pressure of the drill point on the work is momentarily interrupted. The drill bit, rotating at high speed in the bore, will thus break up the metal chips cut from the work piece into particles sufficiently fine to readily pass upwardly through the flutes of the drill. Braking resistance to the driving torque of the drill spindle and the generation of high frictional heat in the bore will thus be reduced to a minimum.

From the foregoing description and the accompanying drawings, the construction, operation and several advantages of the present invention may be clearly understood. As in the patented construction, it will be seen that my improved power feed mechanism utilizes the same conventional type of worm drive gearing and maintains a constantly engaged relation of the worm and worm gear with a constant angular axial relationship between the worm drive shaft and the pinion shaft during the intermittent feeding of the drill spindle. The additional elements required to transmit the periodic accelerated rotary motion to the quill actuating pinion through the worm gearing to produce a rapid succession of advancing step movements of the drill bit into the work, are of very simple structural form and will not materially increase production costs of the patented drill feed mechanism. However, it will be appreciated that by means of my present improvements, the drilling of the bore in the work piece to the required depth may be completed with greater rapidity, without axial deviation of the drill bit, and with greater accuracy in size or diameter of the bore. By the periodic interruption of drilling pressure on the work, the metal chips are finely broken up by the rotating drill bit so that they will offer no serious obstruction to the rotation thereof or the advancing movements of the drill bit into the work. This is particularly important in the drilling of deep holes or bores in tough stock where chips likely to jam a drill would be formed and great frictional heat would otherwise be generated.

It will of course be understood that an adjustable limiting means for the power feed similar to that shown in the issued patent, operates when the hole has been drilled to the maximum predetermined depth to actuate the holding or locking means for the rockable shaft bearing member 32 so that the spring means 38 will then act to swing or move said bearing member downwardly in an arcuate path and disengage the worm 36 from the worm gear 28, thereby discontinuing further feeding movement of the drill spindle. It will further be apparent that the improved power feed mechanism may be manufactured and sold as an independent unit and readily assembled in operative position upon a drilling machine or other machine tool of standard type to control the feeding movement of the cutting tool.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a drilling machine having a quill, a drill spindle rotatably mounted in said quill in axially fixed relation and carrying a fluted drill bit rotated by a suitable motor driven drive element, a power feed mechanism including a second motor driven drive element and power transmitting means drivingly connected to said quill to advance said quill, and a support mounted adjacent said power transmitting means for oscillatory movement in a plane parallel to the axis of said quill: a power feed drive comprising a driving member connected to said second motor driven drive element mounted for limited axial movement in said support, and drivingly connected to said power transmitting means when said support is disposed at one extreme of its oscillatory path; cooperating ratcheting cam surfaces on said driving member and said support slidably coacting to impart axial movement to said driving member in one direction at least once in each revolution of said driving member whereby said power transmitting means is accelerated to provide a normal advancing feed movement of the quill, spindle, and the drill bit; and resilient means positioned around a portion of said driving member between said support and another portion of said driving member to cancel out said axial movement of said driving member at least once in each revolution of said driving member and effect an interruption in said normal advancing feed movement of said quill, spindle, and drill bit to positively break the chip formed by said drill bit from said work, whereby said chip will be positively driven by the flutes of said drill bit in a retrogade direction until it clears the hole formed in the work.

2. In a drilling machine having a quill, a drill spindle rotatably mounted in said quill in axially fixed relation and carrying a fluted drill bit rotated by a suitable motor driven drive element, a power feed mechanism including a second motor driven drive element and power transmitting means drivingly connected to said quill to advance said quill: a power feed drive comprising a driving member connected to said second motor driven drive element for limited axial movement with respect thereto and drivingly connected to said power transmitting means; a support carrying said driving member for limited axial movement therein; cooperating cam surfaces on said driving member and said support slidably coacting intermittently to impart axial movement to said driving member in one direction whereby said power transmitting means is positively accelerated to provide a normal advancing feed movement of the quill, spindle, and the drill bit, and resilient means positioned between said support and said driving member to periodically cancel out the axial movement of the said driving member and effect an interruption in said normal advancing feed movement of said quill, spindle, and drill bit to positively break the chip formed by said drill bit from said work, whereby said chip will be positively driven by the flutes of said drill bit in a retrograde direction until it clears the hole formed in the work.

3. In a drilling machine having a quill, a drill spindle rotatably mounted in said quill in axially fixed relation and carrying a drill bit rotated by a suitable motor driven drive element, and a power feed mechanism including a second motor driven element, and power transmitting means drivingly connected to said quill to advance said quill into a workpiece: a power feed drive comprising a driving member connected to said second motor driven element for limited axial movement with respect thereto and drivingly connected to drive said power transmitting means at a certain rate; a support carrying said driving member for limited axial movement therein; cooperating cam surfaces on said driving member and said support slidably coacting to impart axial movement to said driving member in a direction to positively increase the driving rate of said power transmitting means in quill advancing direction to provide a normal advancing feed movement of the quill, spindle, and the drill bit; and resilient means intermittently effective to negative said increased driving rate and interrupt said normal advancing feed movement of said quill, spindle, and drill bit to positively break the chip formed by said drill bit from said workpiece.

HAROLD F. MARTIN.

REFERENCES CITED

The following references are of record in the file of this patent:

UNITED STATES PATENTS

| Number | Name | Date |
| --- | --- | --- |
| 1,045,246 | Au Buchon | Nov. 26, 1912 |
| 2,237,108 | Nichols | Apr. 1, 1941 |
| 2,396,733 | Wiken et al. | Mar. 19, 1946 |